July 17, 1951  L. A. CONYERS  2,560,635
GAS CLEARING APPARATUS
Filed Jan. 27, 1948  2 Sheets-Sheet 2

INVENTOR.
LLOYD A CONYERS,
BY
McMorrow, Berman & Davidson
ATTORNEYS,

Patented July 17, 1951

2,560,635

UNITED STATES PATENT OFFICE 2,560,635

GAS CLEARING APPARATUS

Lloyd A. Conyers, Compton, Calif.

Application January 27, 1948, Serial No. 4,684

6 Claims. (Cl. 261—98)

This invention relates to improvements in apparatus for removing undesirable and deleterious substances from the flue gases of smoke stacks, flues, and such as the exhaust pipes of Diesel engines, the primary object of the invention being to provide unusually simple, efficient, and widely adaptable means of this character.

Another important object of the invention is the provision of simple, effective, and easily constructed apparatus which can be constructed at low cost, and is capable of adaptation for low cost installation at different points along the flue, smokestack, exhaust pipe, or the like, with which it is to be associated, for the clearing of the flue gases passing therethrough.

Other important objects and advantageous features of the invention will be apparent from the following description, and the drawings thereunto appended, wherein, merely for present purposes of illustration, specific embodiments of the process and apparatus aspects of this invention are set forth in detail.

Figure 1:
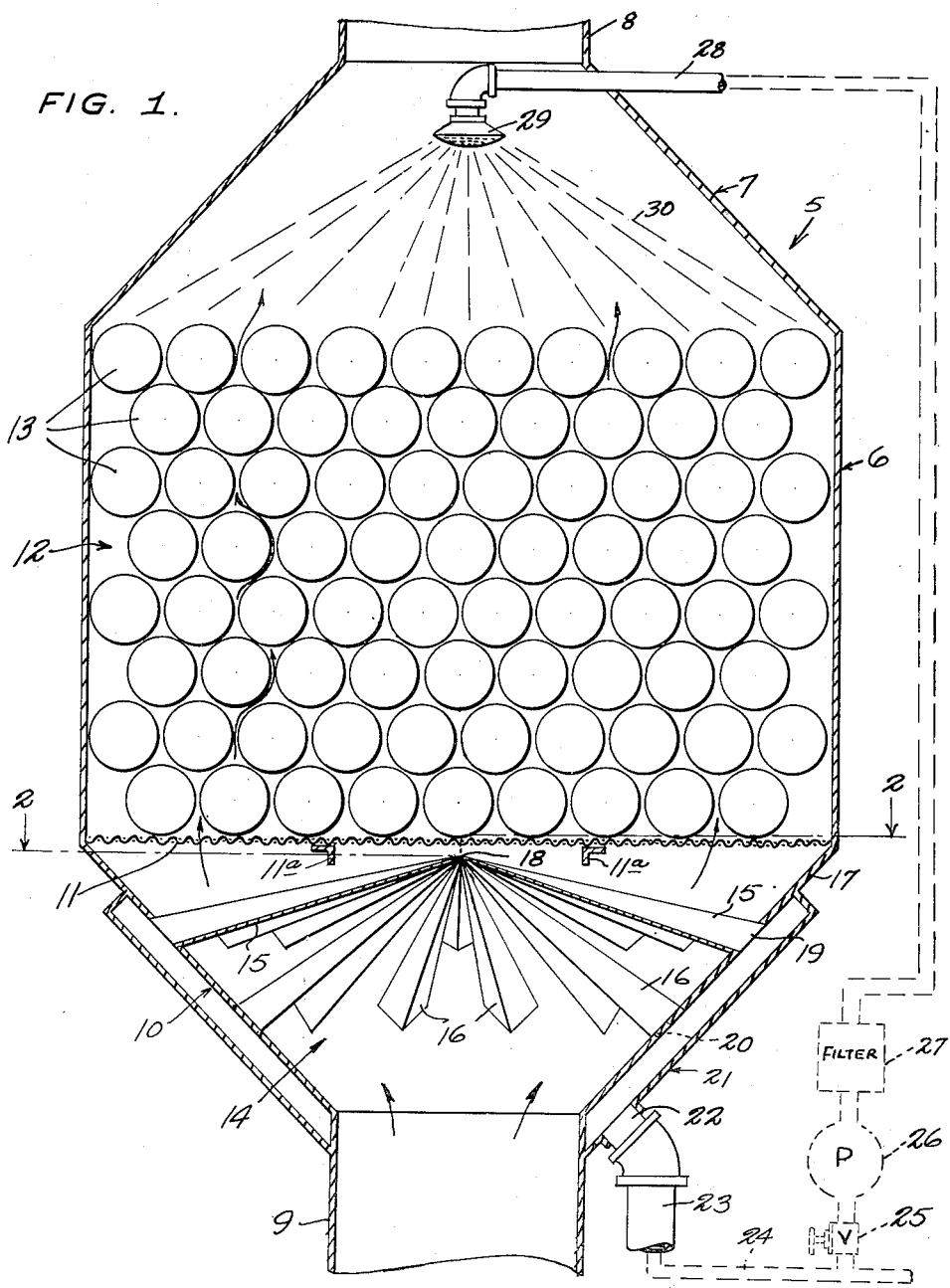
Figure 1 is a fragmentary transverse vertical section taken through apparatus in accordance with this invention, showing in dotted lines an optional arrangement for filtering and re-circulating the wash-fluid after use instead of discharging the same to waste.
Figure 2:
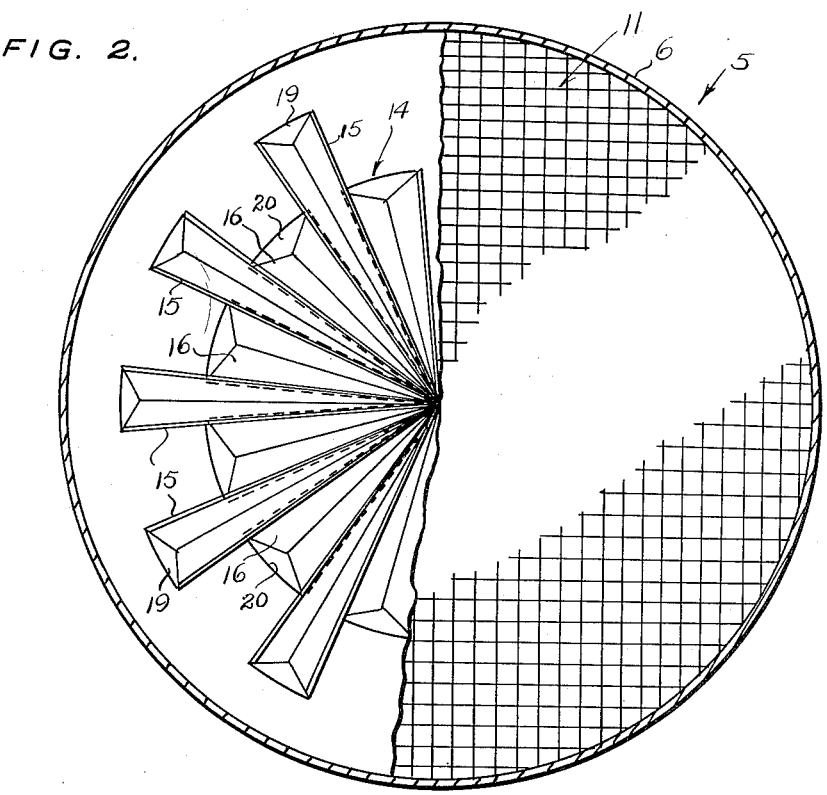
Figure 2 is a horizontal sectional view taken through Figure 1.

Referring in detail to Figures 1 and 2 of the drawings, the illustrated apparatus according to the present invention comprises a casing 5 comprising an intermediate cylindrical part 6, an upper frustro-conical part 7, having its open upper end connected to the outlet portion 8 of a flue or stack, which includes a lower companion portion 9 similarly connected to the open lower end of the inverted frustro-conical or funnel-shaped bottom part 10 depending from the lower end of the cylindrical intermediate part of and constituting the lower part of the casing 5, whereby flue gases, smoke, Diesel engine exhaust or the like rising through the flue or stack enters the lower end of the casing 5, passes therethrough and rises from the upper end of the casing through the upper portion of the stack and is thereby exhausted to the atmosphere.

Figure 3:
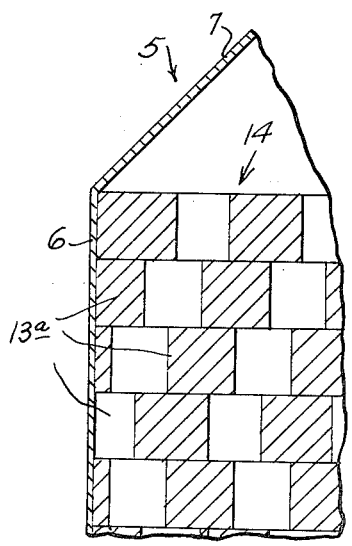
Figure 3 is a fragmentary transverse vertical section taken through apparatus similar to Figure 1 but employing a core of tile blocks or baffles.

A heavy wire screen 11 extending entirely across the casing 5 is supported at the lower end of the intermediate cylindrical part 6 on transverse widely spaced angle irons 11a secured to the sides of the casing. The screen 11 acts as support for a scrubbing or baffle mass 12, consisting in the embodiment shown in Figure 1, of touching balls 13, and in the embodiment shown in Figure 3, of staggered blocks or baffles 13a, of glass, porcelain, tile or other suitable material.

Beneath the screen 11 and mounted on the sidewalls 17 of the inverted frustro-conical lower casing part 10 is a collector 14 consisting of a plurality of triangular cross section upper troughs 15 and lower troughs 16, radiating from the vertical axis of the casing 5 and declining outwardly as far as the sidewall 17, the troughs 15 being equally circumferentially spaced, with the lower trough 16 located in the spaces between the upper troughs 15 and with the adjacent edges of upper and lower troughs overlapping, so that none of the descending wash-fluid can fall directly into the lower stack portion 9, but is caught by the troughs. The troughs are tapered and flare from their inward ends toward their radially outward ends, the radially inward ends of both the upper and lower troughs being joined at the same elevation at the point 18 immediately beneath the center of the screen 11. The larger radially outward ends of the troughs are substantially vertically spaced, as shown in Figure 1, and register with upper and lower openings 19 and 20, respectively, formed in the sidewall 17, so as to drain into a collecting chamber 21 in the form of a spaced jacket around sidewall 17.

The lower part of the collecting chamber 21 has a drain outlet 22, which can be connected to a sewer or other drain pipe 23, or to a filter line 24, which in succession, contains a valve 25, a pump 26, and a filter 27, with the line beyond the filter 27 connecting with the wash-fluid spray pipe 28, whereby the used wash fluid or wash liquid can either be drained to disposal in the sewer pipe 23 or recirculated, after filtering, to the spray pipe 28.

The spray pipe 28 conveniently passes horizontally through the side of the upper portion of the upper casing part 7 and terminates in a spray head 29 arranged axially of the casing 5 and at a substantial distance above the scrubber core 12, and so that wash-fluid spray 30 from the head 29 impinges upon the entire area of the upper surface of the core, as shown in Figure 1.

The lower stack portion 9 is adapted to be connected in any suitable manner to a smoke stack, flue, or exhaust of a stationary, or of a mobile Diesel installation, such as the exhaust pipe of a Diesel truck. The size of the casing 5 depends upon the volume of flue gases to be handled and the amount of contamination present therein. The casing 5 can be installed at the top or at the bottom of the smoke stack, flue, or exhaust pipe, depending upon the conditions to be met.

The wash-fluid employed can be water alone, an aqueous solution, or any other suitable fluid.

In operation, with the spray head 29 in operation and with the wash-fluid trickling through and wetting the balls 13 or blocks 13a of the core 12, and the smoke, flue gas, or exhaust gas rising through the lower stack portion 9 on up through the core 12, the hot gases come in contact with the wet surfaces of the core, with the result that solids, entrained in the gases, adhere to these core surfaces and wash back downwardly with the wash-fluid and are collected by the troughs 15 and 16 and drained to the collecting jacket 21, and pass to the waste pipe 23 or to the filter line 24 for filtering and recirculation to the spray head 29.

Undesirable flue gases, such as $SO_2$ are dissolved by contact with the wash water as it moves through the core 12, and $H_2SO_3$ is thereby formed and drained off with the waste wash water, so that the gases rising from the casing 5 into the upper stack portion 8 pass off into the atmosphere free of such and other undesirable components. As a result, the scrubbed flue gases rising through the upper stack portion 8 are free of soot, ash, smoke and dissolved or entrained gases, which entered the apparatus through the lower stack portion 9, with the flue gases.

Thus, the process of the present invention, as exemplified in the above described operation of suitable apparatus, consists in contacting the hot flue gases with wet scrubbing surfaces maintained in wet condition by a counter-current spray of wash-fluid, in a manner to scrub or strip the contacting gases of solid matter entrained therein while continuously cleaning the scrubbing surfaces of the accumulations of such solids adhering thereto, while at the same time dissolving out of the flue gases any unwanted entrained gases and draining off the resultant solutions so as to preserve or constantly renew the freshness or effectiveness of the dissolving wash-fluid, and continuously and concurrently discharging the cleared flue gases to the atmosphere or other destination, free of contaminating substances. It will be noted that while this process primarily contemplates natural flow of the flue gases in contact with the scrubbing agency and toward discharge, in a direction counter-current to the gravitational flow of the wash-fluid, the use of assistants to the flow both of the entering and discharging gases and to the counter-current movement of the wash-fluid are not excluded. The process further contemplates the collection of the used or waste wash-fluid, its filtering to remove the contamination accumulated therein, and its recirculation, in a manner to provide a closed circuit process, of great efficiency and economy, which is thereby rendered suitable for use with mobile units, such as Diesel trucks and the like, as hereinbefore mentioned, wherein the carrying of a large supply of wash-fluid is not feasible and wherein discharge of the waste wash-fluid presents obvious problems.

What is claimed is:

1. Apparatus for clearing flue gases and the like of contaminating matter including entrained solids and gases, said apparatus comprising a casing having a core comprising scrubbing elements supported intermediate the upper and lower ends of said casing, a wash-fluid spray means in the upper part of said casing above said core and spraying the top of said core with wash-fluid whereby said wash-fluid trickles downwardly through said core and wets the surfaces of said scrubbing elements, a conical collector supported in the lower part of said casing beneath said core arranged to receive the contaminated wash-fluid falling from said core while permitting flow of gas to said core from beneath said collector, gas intake means at the lower end of said casing admitting flue gas into said casing to flow upwardly therein and through said core whereby solid matter entrained therein is caused to adhere to said wet scrubbing elements and contaminating gaseous matter entrained therein is dissolved out in counter-current contact with said wash-fluid, gas discharge means on the upper end of said casing above said spray means for discharging the cleared flue gas rising through said core, said casing comprising an inverted frustro-conical lower part in which said collector is located, said conical collector comprising a plurality of vertically spaced upper and lower troughs within said inverted frustro-conical lower casing part radiating and declining outwardly from a point aligned with the axis of said lower part, with the depressed outer ends of said troughs opening through the sidewall of said inverted frustro-conical lower part with the lower troughs located in the spaces between the upper troughs with their side edges underlapping the side edges of the upper troughs and preventing fluid falling from said core to said gas inlet means while permitting gas rising from said gas inlet means to pass upwardly between the troughs and an annular collecting chamber surrounding said inverted-frustro-conical lower casing part into which the depressed outer ends of said collector troughs drain.

2. Apparatus for clearing flue gases and the like of contaminating matter including entrained solids and gases, said apparatus comprising a casing having a core comprising scrubbing elements supported intermediate the upper and lower ends of said casing, a wash-fluid spray means in the upper part of said casing above said core and spraying the top of said core with wash-fluid whereby said wash-fluid trickles downwardly through said core and wets the surfaces of said scrubbing elements, a collector supported in the lower part of said casing beneath said core arranged to receive the contaminated wash-fluid falling from said core while permitting flow of gas to said core from beneath said collector, gas intake means at the lower end of said casing admitting flue gas into said casing to flow upwardly therein and through said core whereby solid matter entrained therein is caused to adhere to said wet scrubbing elements and contaminating gaseous matter entrained therein is dissolved out in counter-current contact with said wash-fluid, gas discharge-means on the upper end of said casing above said spray means for discharging the cleared flue gas rising through said core, said casing comprising an inverted frustro-conical lower part in which said collector is located, said collector comprising a plurality of vertically spaced upper and lower troughs radiating and declining outwardly from a point aligned with the axis of said lower part, with the outer ends of said troughs communicating with openings formed in the sidewall of said inverted frustro-conical lower part, with the lower troughs located in the spaces between the upper troughs with their side edges underlapping the side edges of the upper trough and preventing fluid falling from said core from reaching said gas inlet means while permitting gas rising from said gas inlet means to pass upwardly between the troughs, an external collecting chamber comprising a jacket surrounding the outside of the sidewall of said inverted frustro-conical lower casing part receiving waste wash-fluid from said openings on the sidewall of said inverted frustro-conical lower casing part.

3. Apparatus for clearing gas comprising a casing having a funnel-shaped bottom, said bottom being adapted to be embracingly mounted over a flue gas discharge outlet, a funnel-shaped shell surrounding said funnel-shaped bottom and spaced from the latter to thereby form a collection chamber, a plurality of troughs arranged in end-to-end downwardly sloping and abutting relation positioned within said funnel-shaped bottom adjacent the upper end thereof and each having the lower end extending through the wall of said funnel-shaped bottom and in communication with said collection chamber, a spray head positioned in said casing adjacent to and spaced from the top thereof for the discharge therethrough of a liquid under pressure, a conduit extending through said casing and connected to said spray head for conveying said liquid under pressure to said spray head from a source of supply, and an outlet in said collection chamber for the discharge of said liquid collected in said collection chamber.

4. Apparatus for clearing gas comprising a casing having a funnel-shaped bottom, said bottom being adapted to be embracingly mounted over a flue gas discharge outlet, a funnel-shaped shell surrounding said funnel-shaped bottom and spaced from the latter to thereby form a collection chamber, a first group of troughs arranged in end to end downwardly sloping and abutting relation positioned within said funnel-shaped bottom adjacent the upper end thereof and each having the lower end extending through the wall of said funnel-shaped bottom and in communication with said collection chamber, a second group of troughs arranged in end to end downwardly sloping and abutting relation positioned within said funnel-shaped bottom below and spaced from said first named group of troughs and each having the lower end extending through the wall of said funnel-shaped bottom and in communication with said collection chamber, a trough of said second named group of troughs being interposed between adjacent troughs of said first named group of troughs, a spray head positioned in said casing adjacent to and spaced from the top thereof for the discharge therethrough of a liquid under pressure, a conduit extending through said casing and connected to said spray head for conveying said liquid under pressure to said spray head from a source of supply, and an outlet in said collection chamber for the discharge of said liquid collected in said collection chamber.

5. Apparatus for clearing gas comprising a casing having a funnel-shaped bottom, said bottom being adapted to be embracingly mounted over a flue gas discharge outlet, a funnel-shaped shell surrounding said funnel-shaped bottom and spaced from the latter to thereby form a collection chamber, a plurality of troughs arranged in end to end downwardly sloping and abutting relation positioned within said funnel-shaped bottom adjacent the upper end thereof and each having the lower end extending through the wall of said funnel-shaped bottom and in communication with said collection chamber, a spray head positioned in said casing adjacent to and spaced from the top thereof for the discharge therethrough of a liquid under pressure, a conduit extending through said casing and connected to said spray head for conveying said liquid under pressure to said spray head from a source of supply, an outlet in said collection chamber for the discharge of said liquid collected in said collection chamber, a horizontally disposed reticulated support positioned within said casing adjacent to the upper end of said funnel-shaped bottom and fixedly secured to said casing, and a baffle mass embodying a plurality of baffle elements arranged in abutting relation with respect to each other positioned upon said reticulated support for retarding the flow and causing dissemination of said liquid in its passage through said casing.

6. Apparatus for clearing gas comprising a casing having a funnel-shaped bottom, said bottom being adapted to be embracingly mounted over a flue gas discharge outlet, a funnel-shaped shell surrounding said funnel-shaped bottom and spaced from the latter to thereby form a collection chamber, a first group of troughs arranged in end to end downwardly sloping and abutting relation positioned within said funnel-shaped bottom adjacent the upper end thereof and each having the lower end extending through the wall of said funnel-shaped bottom and in communication with said collection chamber, a second group of troughs arranged in end to end downwardly sloping and abutting relation positioned within said funnel-shaped bottom below and spaced from said first named group of troughs and each having the lower end extending through the wall of said funnel-shaped bottom and in communication with said collection chamber, the troughs of said second named group of troughs being interposed between adjacent troughs of said first named group of troughs, a spray head positioned in said casing adjacent to and spaced from the top thereof for the discharge therethrough of a liquid under pressure, a conduit extending through said casing and connected to said spray head for conveying said liquid under pressure to said spray head from a source of supply, an outlet in said collection chamber for the discharge of said liquid collected in said collection chamber, a horizontally disposed reticulated support positioned within said casing adjacent to the upper end of said funnel-shaped bottom and fixedly secured to said casing, and a baffle mass embodying a plurality of baffle elements arranged in abutting relation with respect to each other positioned upon said reticulated support for retarding the flow and causing dissemination of said liquid in its passage through said casing.

LLOYD A. CONYERS.

REFERENCES CITED

The following references are of record in the file of this patent:

UNITED STATES PATENTS

| Number | Name | Date |
| --- | --- | --- |
| 700,859 | Thomas | May 27, 1902 |
| 1,047,534 | Joseph | Dec. 17, 1912 |
| 2,080,713 | Hayes | May 18, 1937 |
| 2,090,994 | Brandes | Aug. 24, 1937 |
| 2,103,521 | Luly | Dec. 28, 1937 |
| 2,253,261 | Bacon | Aug. 19, 1941 |
| 2,311,155 | Carr | Feb. 16, 1943 |